(12) United States Patent
Drennen et al.

(10) Patent No.: US 10,830,321 B2
(45) Date of Patent: Nov. 10, 2020

(54) ACTUATOR BALL SCREW FOR IMPROVED LOAD SHARING

(71) Applicant: Goodrich Corporation, Charlotte, NC (US)

(72) Inventors: David Drennen, Bellbrook, OH (US); Harald Klode, Centerville, OH (US); Kevin Rehfus, Dayton, OH (US); Satinder Mann, Vandalia, OH (US); Marc Georgin, Dayton, OH (US); Robert French, Beavercreek, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 552 days.

(21) Appl. No.: 15/047,977

(22) Filed: Feb. 19, 2016

(65) Prior Publication Data

US 2017/0241526 A1    Aug. 24, 2017

(51) Int. Cl.
*F16H 25/24*    (2006.01)
*F16D 65/18*    (2006.01)
(Continued)

(52) U.S. Cl.
CPC .............. *F16H 25/24* (2013.01); *F16D 65/18* (2013.01); *F16H 25/2204* (2013.01); *F16H 25/2228* (2013.01); *F16D 2121/20* (2013.01); *F16D 2121/24* (2013.01); *F16D 2125/40* (2013.01); *F16H 2025/2087* (2013.01); *F16H 2025/2445* (2013.01)

(58) Field of Classification Search
CPC ... F16H 25/24; F16H 2025/2445; F16D 65/18
See application file for complete search history.

(56) References Cited

U.S. PATENT DOCUMENTS

| 2,756,609 A | 7/1956 | Hogan et al. |
| 3,369,423 A | 2/1968 | Hamilton |

(Continued)

FOREIGN PATENT DOCUMENTS

| EP | 3121476 | 1/2017 |
| JP | H062750 | 1/1994 |

(Continued)

OTHER PUBLICATIONS

EP Search Report dated Aug. 31, 2017 in EP Application No. 17156836.3.

(Continued)

*Primary Examiner* — Zakaria Elahmadi
(74) *Attorney, Agent, or Firm* — Snell & Wilmer L.L.P.

(57) ABSTRACT

The present disclosure provides an actuator assembly having a ball nut comprising a helical track and a ball screw. The ball screw of the actuator assembly includes a first translation bearing track having a first diameter, wherein the helical track and the first translation bearing track form a first translation bearing raceway in which a first translation bearing ball is disposed. The ball screw further includes a second translation bearing track having a second diameter, wherein the helical track and the second translation bearing track form a second translation bearing raceway in which a second translation bearing ball is disposed. The first diameter and the second diameter are not equal.

13 Claims, 4 Drawing Sheets

(51) Int. Cl.
*F16H 25/22* (2006.01)
*F16D 125/40* (2012.01)
*F16D 121/20* (2012.01)
*F16D 121/24* (2012.01)
*F16H 25/20* (2006.01)

(56) References Cited

U.S. PATENT DOCUMENTS

| | | | | |
|---|---|---|---|---|
| 4,221,137 | A * | 9/1980 | Futaba | B62D 3/08 74/216.3 |
| 5,467,662 | A * | 11/1995 | Lange | F16C 19/505 74/424.83 |
| 5,622,082 | A | 4/1997 | Machelski | |
| 6,282,972 | B2 * | 9/2001 | Kuramochi | F16H 25/2214 74/459.5 |
| 8,950,282 | B2 * | 2/2015 | Babinski | B23P 15/00 74/424.82 |
| 9,605,723 | B2 * | 3/2017 | Rehfus | B64C 25/44 |
| 10,220,874 | B2 * | 3/2019 | Bae | B62D 5/0448 |
| 2002/0185336 | A1 * | 12/2002 | West | F16H 25/2214 184/5 |
| 2006/0230849 | A1 | 10/2006 | Yabe | |
| 2007/0006676 | A1 * | 1/2007 | Mizuhara | B62D 5/0448 74/424.86 |
| 2009/0268994 | A1 * | 10/2009 | Kawashima | F16C 25/08 384/43 |
| 2009/0308192 | A1 * | 12/2009 | Lin | F16H 25/2204 74/424.81 |
| 2010/0043582 | A1 * | 2/2010 | Tateishi | B23B 27/065 74/424.81 |
| 2013/0068053 | A1 * | 3/2013 | Cahill | F16D 65/186 74/89.37 |
| 2014/0144263 | A1 * | 5/2014 | Yoshioka | B62D 5/0448 74/89.23 |
| 2014/0238166 | A1 * | 8/2014 | Jeon | B62D 3/08 74/89.23 |
| 2015/0001034 | A1 * | 1/2015 | Drennen | F16D 63/006 192/219.4 |
| 2015/0007675 | A1 * | 1/2015 | Drennen | F16H 25/2204 74/89.23 |
| 2015/0008091 | A1 * | 1/2015 | Drennen | F16D 49/02 192/219.4 |
| 2015/0114150 | A1 * | 4/2015 | Drennen | F16H 25/2204 74/89.23 |
| 2015/0115778 | A1 * | 4/2015 | Drennen | H02K 7/06 310/68 B |
| 2015/0122061 | A1 * | 5/2015 | Drennen | F16H 25/2015 74/89.23 |
| 2016/0122009 | A1 * | 5/2016 | Drennen | B64C 25/44 188/156 |
| 2016/0123417 | A1 * | 5/2016 | Rehfus | F16D 65/16 188/162 |
| 2016/0123445 | A1 * | 5/2016 | Drennen | F16H 25/2204 74/434 |
| 2016/0207614 | A1 * | 7/2016 | Rehfus | B64C 25/44 |
| 2016/0305501 | A1 * | 10/2016 | Rehfus | B60T 17/22 |
| 2017/0175860 | A1 * | 6/2017 | Ott | F16C 33/585 |

FOREIGN PATENT DOCUMENTS

| | | |
|---|---|---|
| JP | 2005344831 | 12/2005 |
| WO | 2014108792 | 7/2014 |

OTHER PUBLICATIONS

European Patent Office, European Search Report dated Mar. 25, 2019 in Application No. 19150757.

* cited by examiner

ACTUATOR BALL SCREW FOR IMPROVED LOAD SHARING

FIELD OF THE DISCLOSURE

The subject matter disclosed herein relates to actuator assemblies, and more particularly, to brake actuator ball screw assemblies.

BACKGROUND OF THE DISCLOSURE

Electric brakes (e.g., aircraft brakes) often include a ball screw for linear translation. A ball screw typically converts rotational motion into translational motion by rotating the ball screw, which translates a ball nut. Power dense actuator assemblies may comprise a ball screw and a stationary motor housing, wherein one or more rolling element bearings (e.g., balls or rollers) are in contact with the ball screw and motor housing to form a multi-row thrust bearing. Such an actuator assembly may also comprise a ball nut configured to engage the ball screw, such that rotational motion of the ball screw causes translation of the ball nut. In an electric aircraft brake, the ball nut may (either directly or by way of other components) apply force to a brake stack to create frictional resistance to rotary movement of the wheel to stop the aircraft. Aircraft brake actuators may be subject to weight limitations and high load capacities. Under operational load conditions, components of aircraft brake actuators may be prone to excessive deflection. Excessive deflection may cause damage to aircraft brake actuator components or decrease the lifecycle of such components due to unequal load sharing leading to high stresses.

SUMMARY OF THE DISCLOSURE

In various embodiments, the present disclosure provides an actuator assembly that includes a ball nut comprising a helical track and a ball screw. The ball screw includes a first translation bearing track having a first diameter, wherein the helical track and the first translation bearing track form a first translation bearing raceway in which a first translation bearing ball is disposed. The ball screw also includes a second translation bearing track having a second diameter, wherein the helical track and the second translation bearing track form a second translation bearing raceway in which a second translation bearing ball is disposed. In various embodiments, the first diameter and the second diameter are not equal.

In various embodiments, the first translation bearing track of the actuator assembly includes a cross-under track having a cross-under portion. The ball screw may further include a third translation bearing track having a third diameter, wherein the helical track and the third translation bearing track form a third translation bearing raceway in which a third translation bearing ball is disposed. In various embodiments, the first diameter is larger than the second diameter and/or the third diameter. The first translation bearing track is proximal to the second translation bearing track and the third translation bearing track. Further, the first translation bearing track is distal to the second translation bearing track and the third translation bearing track. In various embodiments, the first translation bearing track is medial to the second translation bearing track and the third translation bearing track. In various embodiments, the first translation bearing raceway comprises a proximal-most translation bearing raceway disposed in the actuator assembly.

In various embodiments, an actuator assembly includes an actuator drive unit (ADU) housing comprising a first ADU track and a second ADU track and a ball screw comprising. The ball screw comprises a first thrust bearing track having a fourth diameter, wherein the first ADU track and the first thrust bearing track form a first thrust bearing raceway in which a plurality of first thrust bearing balls are disposed. The ball screw also includes a second thrust bearing track having a fifth diameter, wherein the second ADU track and the second thrust bearing track form a second thrust bearing raceway in which a plurality of second thrust bearing balls are disposed. In various embodiments, the fourth diameter and the fifth diameter are not equal.

In various embodiments, the ADU housing of the actuator assembly includes a third ADU track and the ball screw includes a third thrust bearing track having a sixth diameter. The third ADU track and the third thrust bearing track form a third thrust bearing raceway in which a third thrust bearing ball is disposed. In various embodiments, the fourth diameter of the first thrust bearing track is larger than at least one of the fifth diameter or the sixth diameter. The first thrust bearing track is proximal to the second thrust bearing track and the third thrust bearing track and the first thrust bearing track is distal to the second thrust bearing track and the third thrust bearing track. In various embodiments, the first thrust bearing track of the ball screw is medial to the second thrust bearing track and the third thrust bearing track. In various embodiments, the first thrust bearing raceway comprises a distal-most thrust bearing raceway disposed in the actuator assembly.

In various embodiments, an brake actuator comprising an actuator assembly having a variable bearing raceway size configuration. Accordingly, the actuator assembly of the brake actuator comprises a ball nut including a helical track and a ball screw. The ball screw includes a first translation bearing track, wherein the helical track and the first translation bearing track form a first translation bearing raceway having a first diameter in which a first translation bearing ball is disposed. The ball screw further includes a second translation bearing track, wherein the helical track and the second translation bearing track form a second translation bearing raceway having a second diameter in which a plurality of second translation bearing balls are disposed. In various embodiments, the first diameter of the first translation bearing raceway and the second diameter of the second translation bearing raceway are not equal.

In various embodiments, the ball screw of the brake actuator also includes a third translation bearing track, wherein the helical track and the third translation bearing track form a third translation bearing raceway having a third diameter in which a third translation bearing ball is disposed. In various embodiments, the first diameter is larger than the second diameter and/or the third diameter.

In various embodiments, the actuator assembly of the brake actuator also includes an ADU housing including a first ADU track and a second ADU track. The actuator assembly further includes a ball screw having a first thrust bearing track, wherein the first ADU track and the first thrust bearing track form a first thrust bearing raceway having a fourth diameter in which a plurality of first thrust bearing balls are disposed. The ball screw also has a second thrust bearing track, wherein the second ADU track and the second thrust bearing track form a second thrust bearing raceway having a fifth diameter in which a second thrust bearing ball is disposed. In various embodiments, the first diameter and the second diameter are not equal.

The ADU housing may further include a third ADU track and a ball screw, which includes a third thrust bearing track. In various embodiments, the third ADU track and the third thrust bearing track form a third thrust bearing raceway having a sixth diameter in which a third thrust bearing ball is disposed. Further, the fourth diameter may be larger than the fifth diameter and/or the sixth diameter.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, systems and methods may find particular use in connection with brake actuator ball screw assemblies. However, various aspects of the disclosed embodiments may be adapted for optimized performance with a variety of brake actuators and/or actuator assemblies. As such, numerous applications of the present disclosure may be realized.

In various embodiments, a brake actuator may include an actuator assembly comprising a ball screw, a ball nut, and an actuator drive unit (ADU) housing. In various embodiments, the actuator assembly may further comprise a translation bearing raceway and/or one or more thrust bearing raceways. In various embodiments, the translation bearing raceway may comprise an annular track between the ball nut and the ball screw having a plurality of translation bearing balls disposed therein. In various embodiments, a thrust bearing raceway may comprise an annular track between the ball screw and the ADU housing having a plurality of thrust bearing balls disposed therein. The ball screw may rotate in order to drive the ball nut in an axial direction.

In various embodiments, a puck coupled to the ball nut may contact a brake stack. In various embodiments, the contact with the brake stack may exert an axial load through the ball nut and the ball screw to the ADU housing via the translation bearing balls and the thrust bearing balls. In various embodiments, contact with the brake stack may cause deflection of the ball nut and/or the ball screw. In various embodiments, one or more rows of translation bearing balls in the translation bearing raceway and thrust bearing balls in the thrust bearing raceways may utilize non-matching track diameters to increase a load capacity of the brake actuator.

In various embodiments, the actuator assembly may comprise a variable translation bearing track size configuration, wherein a first row translation bearing track has a first diameter and a second row translation bearing track has a second diameter that is different than the first diameter. Stated differently, the variable translation bearing track size configuration may comprise balls having a uniform size within multiple variably sized rows. In various embodiments, the variable translation bearing track size configuration may be desirable for reasons including, without limitation, improved load sharing among actuator assembly components, improved actuator assembly life, reduced actuator assembly size and/or weight based on a reduced number of raceways, and the like.

In various embodiments, the actuator assembly may comprise a variable bearing raceway size configuration, wherein a first row bearing raceway has a first diameter and a second row bearing raceway has a second diameter that is different than the first diameter. Similar to the variably sized translation bearing track and/or thrust bearing track as disclosed herein, the variable size configuration for the translation bearing raceway and/or thrust bearing raceway may comprise balls having a uniform size within multiple variably sized rows. In accordance with various embodiments, the translation bearing raceway size is modified by a change to the diameter of the translation bearing track. Likewise, the thrust bearing raceway size is modified by a change to either the diameter of the corresponding ADU track, the diameter of the thrust bearing track, or a combination thereof.

Figure 1:
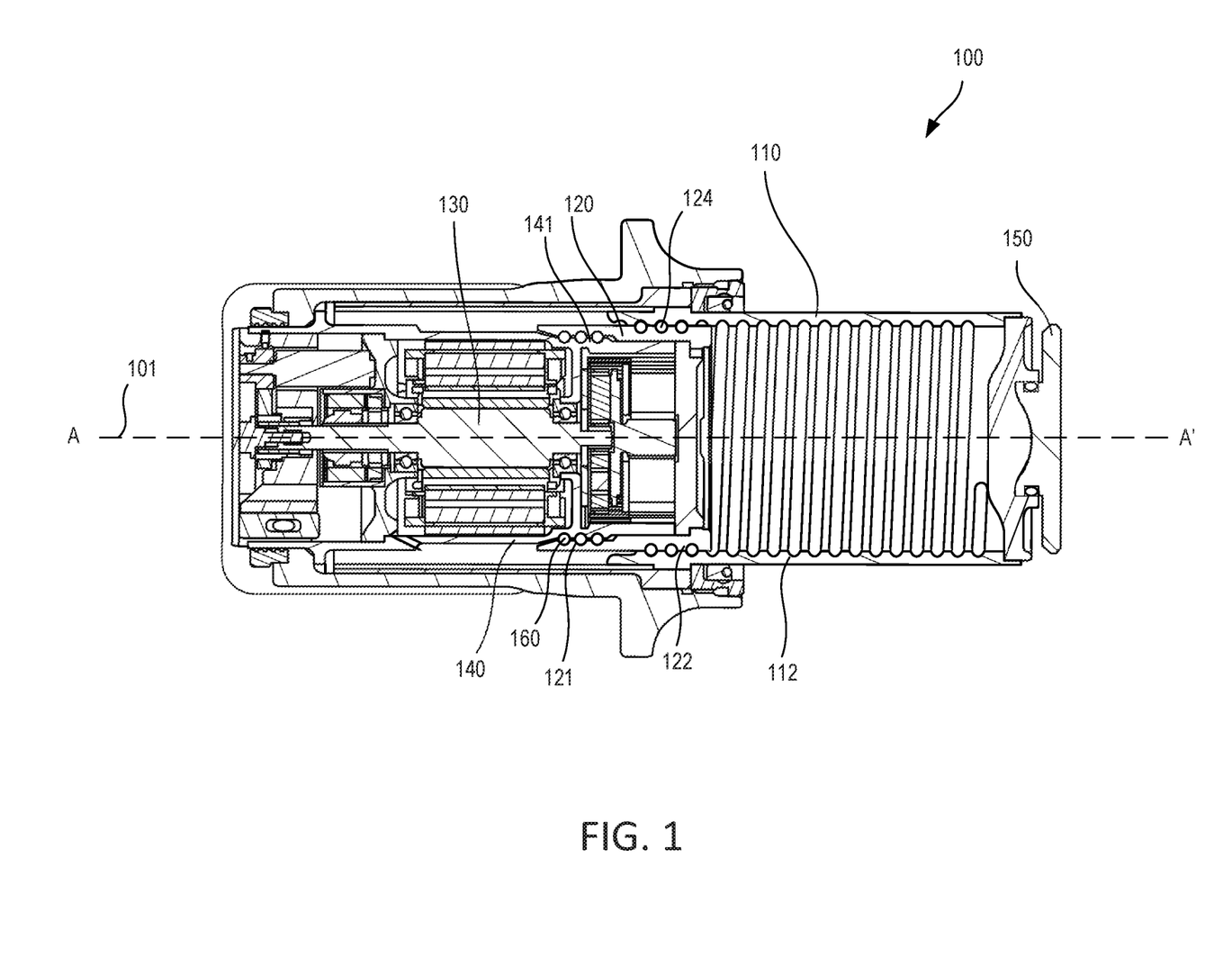
FIG. 1 illustrates a cross section view of a portion of an actuator assembly in accordance with various embodiments.

Referring to FIG. 1, in various embodiments an actuator 100 may extend along an axis 101 marked A-A', with A being located near a distal portion of actuator 100 and A' being near a proximal portion of actuator 100. In various embodiments, actuator 100 may, as described above, comprise a brake actuator and/or be involved in the application of a braking force to a wheel (e.g., aircraft wheel). In various embodiments, actuator 100 may comprise a variety of components, including, for example, a ball nut 110, a ball screw 120, and an ADU 130. In various embodiments, the ADU 130 may be located within an ADU housing 140.

In various embodiments, ball screw 120 includes one or more translation bearing track 122. In various embodiments, translation bearing track 122 may comprise annular or substantially annular grooves and/or channels disposed in a radially outward surface of ball screw 120. In various embodiments, a ball nut 110 may comprise a helical track 112, which is disposed in a radially inward surface of ball nut 110. In various embodiments, ball nut 110 may be configured to at least partially surround ball screw 120 such that one or more translation bearing track 122 and helical track 112 align to form a translation bearing raceway.

Figure 4:
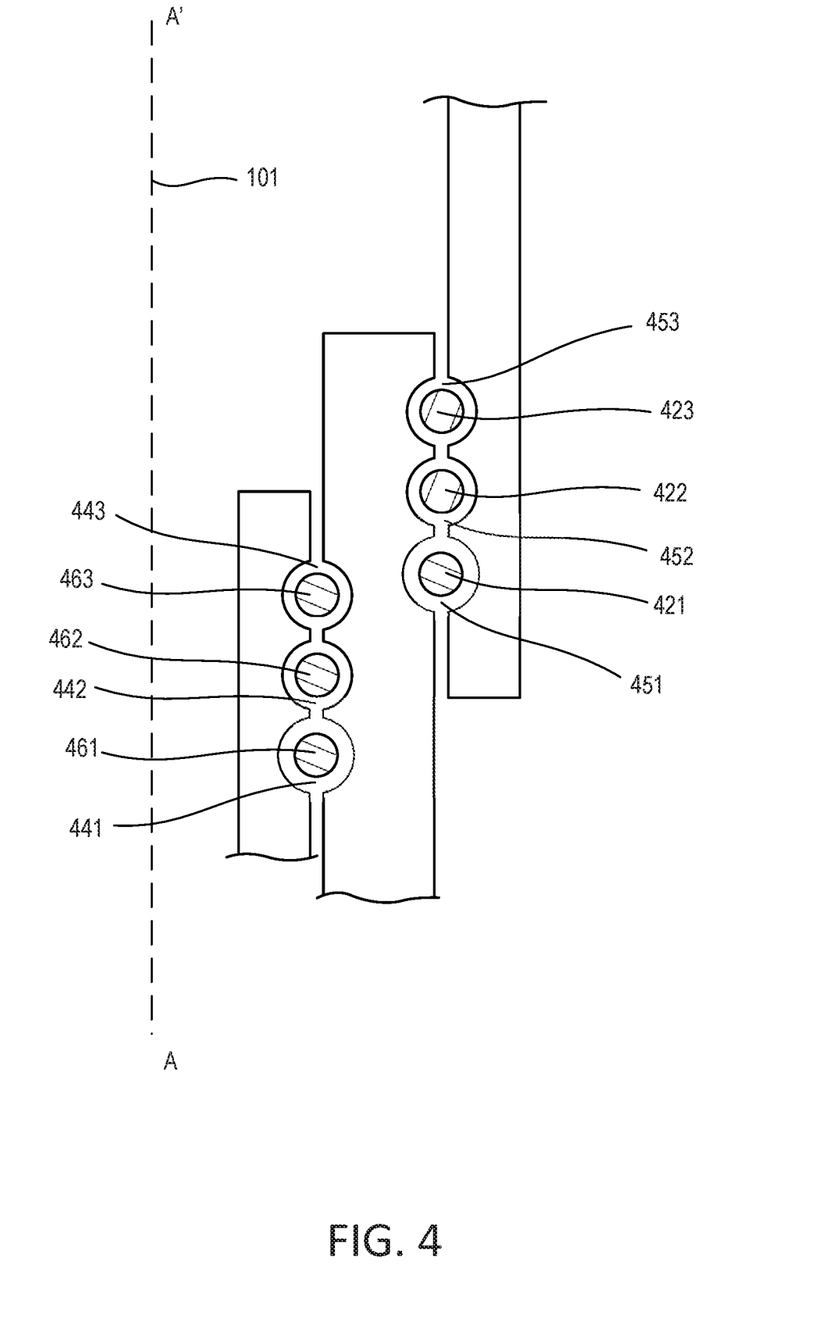
FIG. 4 illustrates a partial cross section view of an actuator assembly, including tracks and raceways in accordance with various embodiments.

With reference to FIG. 4, a translation bearing ball is disposed within a translation bearing raceway to generally decrease friction and transfer loads between adjacent components. In various embodiments, a translation bearing ball 124 may comprise a plurality of metal spheres (e.g., ball-bearings). However, translation bearing ball 124 may comprise any material and any shape suitable for use in an actuator assembly. In various embodiments, rolling element bearings that are not spherical in shape could be used in place of translation bearing ball 124. For example, cylindrical rollers may be used in place of translation bearing ball 124. In various embodiments, as ball screw 120 rotates, ball nut 110 may translate distally and/or proximally along the axis 101 marked A-A' (depending upon the direction of rotation of ball screw 120).

In various embodiments, ball screw 120 may further comprise one or more thrust bearing track 121. In various embodiments, thrust bearing track 121 may comprise annular or substantially annular grooves and/or channels disposed in a radially inward surface of ball screw 120. In various embodiments, ADU housing 140 may comprise one or more ADU track 141 disposed in a radially outward surface of ADU housing 140. In various embodiments, ball screw 120 may be configured to at least partially surround ADU housing 140 such that one or more thrust bearing track 121 and one or more ADU track 141 align to form a thrust bearing raceway (with momentary reference to FIG. 4).

With reference to FIG. 4, a plurality of thrust bearing ball 160 may be disposed within a thrust bearing raceway and distribute a load applied on ADU housing 140 from ball screw 120. In various embodiments, thrust bearing ball 160 may each comprise a metal sphere (e.g., ball bearing), which tend to decrease friction and transfer loads between adjacent components.

In various embodiments, ball nut 110 may be coupled to a disc or "puck," 150 at a distal end thereof. In various embodiments, puck 150 may exert a pressure against a brake stack coupled to a wheel to impede or halt rotation of the wheel. In various embodiments, the force may be transferred back through puck 150, to ball nut 110, to ball screw 120, and to ADU housing 140.

Figure 2:
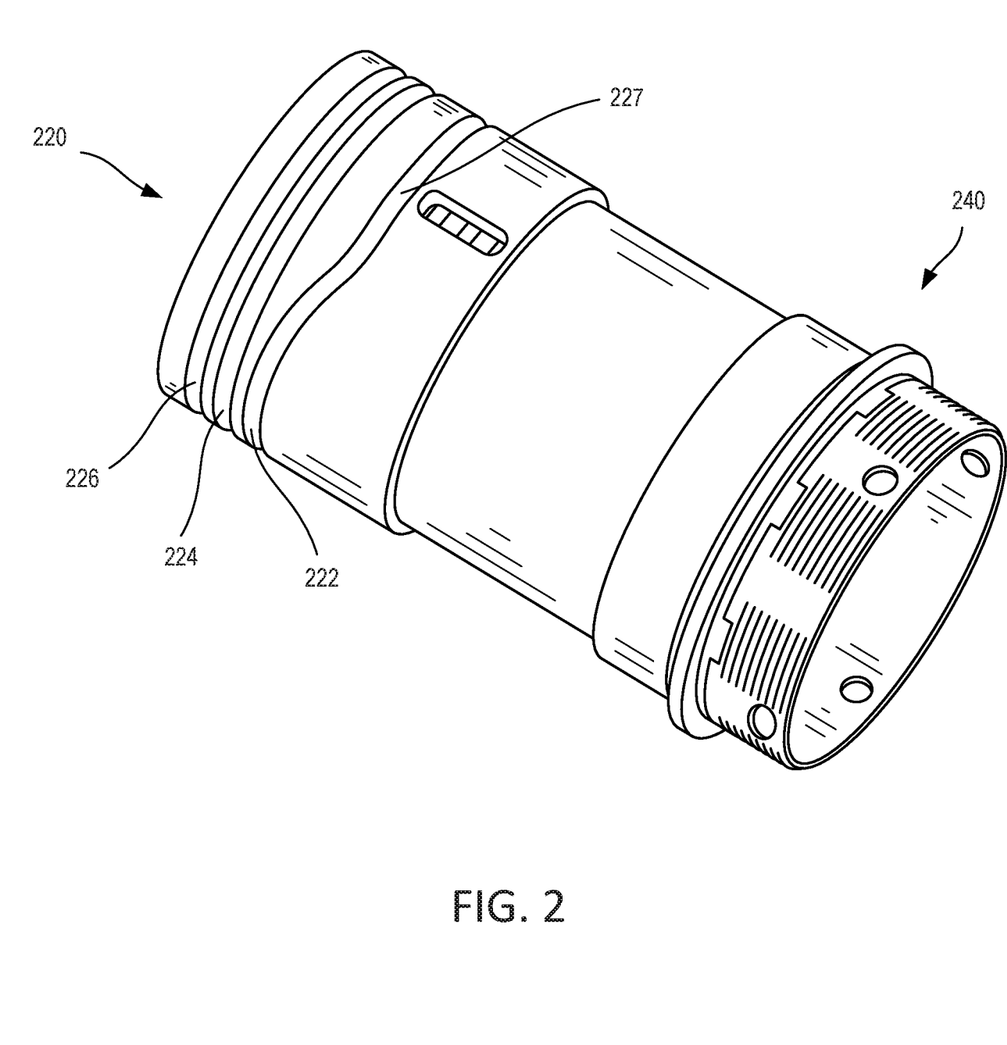
FIG. 2 illustrates a perspective view including portions of a ball screw and an actuator drive unit (ADU) housing in accordance with various embodiments.

Referring to FIG. 2, a perspective view of a ball screw 220 and ADU housing 240 is illustrated according to various embodiments. In various embodiments, ball screw 220 may comprise a first translation bearing track 222 and a second translation bearing track 224. In various embodiments, ball screw 220 may further comprise a third translation bearing track 226.

In various embodiments, any one or more of the first translation bearing track 222, second translation bearing track 224, and third translation bearing track 226 may be configured as a cross-under track. However, those of ordinary skill in the art will appreciate that various embodiments may include any number of translation bearing tracks, cross-under tracks and ball bearings. Moreover, any cross-under track may include any number of translation tracks. As used herein, a cross-under track is independent and self-contained, meaning that bearings in one cross-under track do not enter into any other track or cross-under track. The cross-under track includes a cross-under portion 227, where a radial depth of first translation bearing track 222 is greater than the remaining portion of first translation bearing track 222. A greater radial depth allows translation bearing balls to move under the threads of a ball nut to reset to the top-most position on the cross-under track.

Figure 3:
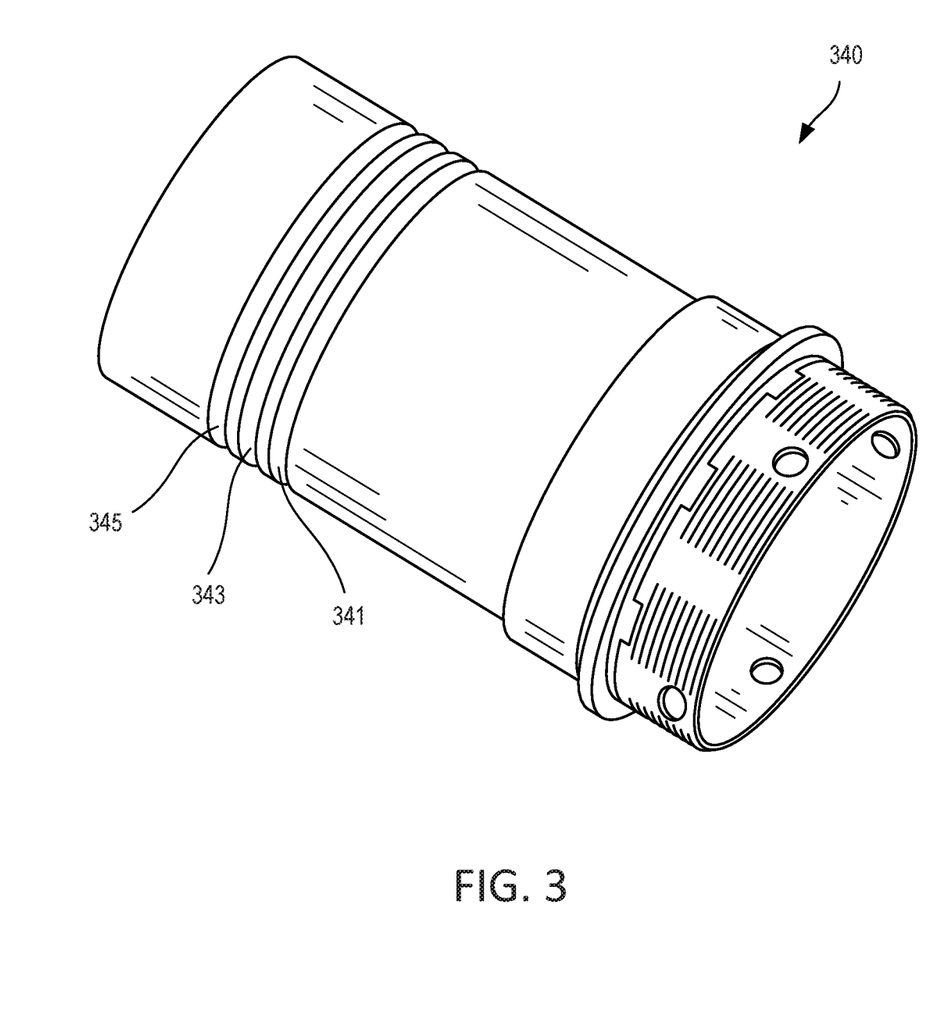
FIG. 3 illustrates a perspective view of an ADU housing in accordance with various embodiments.

Referring to FIG. 3, a perspective view of an ADU housing 340 is illustrated according to various embodiments. For simplicity, various embodiments of ADU housing 340 are described herein, as having a first ADU track 341, a second ADU track 343, and a third ADU track 345. However, those of ordinary skill in the art will appreciate that various embodiments may include fewer than three ADU tracks, while others may include more than three ADU tracks and any number of ball bearings may be disposed within the ADU tracks. The numbers of ADU tracks and ball bearings disposed therein may vary among ADU housing 340 configurations without departing from the scope of this disclosure. Moreover, the number of ADU tracks that are configured as cross-under tracks is also not limited to any numbers described herein.

Referring to FIG. 4, in various embodiments, a plurality of first translation bearing ball 421 may be disposed in a first translation bearing raceway 451 comprising a first diameter. In various embodiments, a plurality of second translation bearing ball 422 may be disposed in a second translation bearing raceway 452 comprising a second diameter. In the context of the various embodiments, "diameter" represents the groove width measurement for each referenced raceway. In various embodiments, the first diameter is larger than the second diameter. In various embodiments, first diameter may be about 5-15 micrometers (0.0002-0.0006 inches) larger than second diameter. In various embodiments, first diameter may be about 8-11 micrometers (0.0003-0.0004 inches) larger than second diameter. In various embodiments, first diameter may be about 10.16 micrometers (0.0004 inches) larger than second diameter, wherein the term about in this context only means +/−2.54 micrometers (0.0001 inches).

In various embodiments, a plurality of third translation bearing ball 423 may be disposed in a third translation bearing raceway 453 comprising a third diameter. In various embodiments, first diameter may be larger than second diameter and/or third diameter. In various embodiments, second diameter may be larger than third diameter. In the context of the various embodiments, "diameter" represents the groove width measurement for each referenced raceway.

In various embodiments, first translation bearing raceway 451 may be disposed distal of second translation bearing raceway 452 and/or third translation bearing raceway 453. In various embodiments, first translation bearing raceway 451 may comprise the distal-most translation bearing raceway disposed in the actuator assembly. In various embodiments, first translation bearing raceway 451 may be disposed proximal of second translation bearing raceway 452 and/or third translation bearing raceway 453. In various embodiments, first translation bearing raceway 451 may comprise the proximal-most translation bearing raceway disposed in the actuator assembly.

With continued reference to FIG. 4, in various embodiments, a plurality of first thrust bearing ball 461 may be disposed in a first thrust bearing raceway 441 comprising a fourth diameter. In various embodiments, a plurality of second thrust bearing ball 462 may be disposed in a second thrust bearing raceway 442 comprising a fifth diameter. In various embodiments, the fourth diameter is larger than the fifth diameter. In various embodiments, fourth diameter may be about 5-15 micrometers (0.0002-0.0006 inches) larger than fifth diameter. In various embodiments, fourth diameter may be about 8-11 micrometers (0.0003-0.00041 inches) larger than fifth diameter. In various embodiments, fourth diameter may be about 10.16 micrometers (0.0004 inches) larger than fifth diameter, wherein the term about means +/−2.54 micrometers (0.0001 inches).

In various embodiments, a plurality of third thrust bearing ball 463 may be disposed in a third thrust bearing raceway 443 comprising a sixth diameter. In various embodiments, fourth diameter may be larger than fifth diameter and/or sixth diameter. In various embodiments, fifth diameter may be larger than sixth diameter.

In various embodiments, first thrust bearing raceway 441 may be disposed distal of second thrust bearing raceway 442 and/or third thrust bearing raceway 443. In various embodiments, first thrust bearing raceway 441 may comprise the distal-most thrust bearing raceway disposed in the actuator assembly. In various embodiments, first thrust bearing raceway 441 may be disposed proximal of second thrust bearing raceway 442 and/or third thrust bearing raceway 443. In various embodiments, first thrust bearing raceway 441 may comprise the proximal-most thrust bearing raceway disposed in the actuator assembly.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An actuator assembly comprising:
   a centerline along which the actuator assembly extends;
   a ball nut comprising a helical track disposed about the centerline;
   a ball screw comprising an inner surface and an outer surface relative to the centerline, the inner surface of the ball screw comprising at least one thrust bearing track disposed about the centerline, the outer surface of the ball screw comprising at least one translation bearing track disposed about the centerline;
   a first translation bearing raceway between the ball nut and the at least one translation bearing track of the ball screw and in which a first translation bearing ball is disposed, the first translation bearing raceway comprising a first raceway diameter and the first translation bearing ball comprising a first translation bearing ball diameter; and
   a second translation bearing raceway between the ball nut and the at least one translation bearing track of the ball screw and in which a second translation bearing ball is disposed, the second translation bearing raceway comprising a second raceway diameter and the second translation bearing ball comprising a second translation bearing ball diameter,
   wherein the first raceway diameter and the second raceway diameter are not equal, and wherein the first translation bearing ball diameter and the second translation bearing ball diameter are equal;
   an actuator drive unit (ADU) comprising at least one ADU track;
   a first thrust bearing raceway between the at least one thrust bearing track of the ball screw and the at least one ADU track and in which a first thrust bearing ball is disposed, the first thrust bearing raceway comprising a third raceway diameter and the first thrust bearing ball comprising a first thrust bearing ball diameter; and
   a second thrust bearing raceway between the at least one thrust bearing track of the ball screw and the at least one ADU track and in which a second thrust bearing ball is disposed, the first thrust bearing raceway comprising a fourth raceway diameter and the first thrust bearing ball comprising a first thrust bearing ball diameter, wherein the third raceway diameter and the fourth raceway diameter are not equal, and wherein the first thrust bearing ball diameter and second thrust bearing ball diameter are equal.

2. The actuator assembly of claim 1, wherein at least one translation bearing track comprises a cross-under track having a cross-under portion.

3. The actuator assembly of claim 1, further comprising:
   a third translation bearing raceway between the ball nut and the at least one translation bearing track of the ball screw and in which a third translation bearing ball is disposed, the third translation bearing raceway comprising a third raceway diameter.

4. The actuator assembly of claim 3, wherein the first raceway diameter is larger than at least one of the second raceway diameter or the third raceway diameter.

5. The actuator assembly of claim 4, wherein the first translation bearing raceway is proximal to the second translation bearing raceway and the third translation bearing raceway relative to a puck end of the actuator assembly.

6. The actuator assembly of claim 4, wherein the first translation bearing raceway is distal to the second translation bearing raceway and the third translation bearing raceway relative to a puck end of the actuator assembly.

7. The actuator assembly of claim 4, wherein the first translation bearing raceway comprises a proximal-most translation bearing raceway relative to a puck end of the actuator assembly and disposed in the actuator assembly.

8. The actuator assembly of claim 1, wherein the third raceway diameter is larger than the fourth raceway diameter.

9. The actuator assembly of claim 1, further comprising: bearing track form a third thrust bearing raceway the ball screw and the at least one ADU track and in which a third thrust bearing ball is disposed, the third thrust bearing raceway comprising a fifth raceway diameter.

10. The actuator assembly of claim 9, wherein the third raceway diameter is larger than at least one of the fourth raceway diameter or the fifth raceway diameter.

11. The actuator assembly of claim 10, wherein the first thrust bearing raceway is proximal to the second thrust bearing raceway and the third thrust bearing raceway relative to a puck end of the actuator assembly.

12. The actuator assembly of claim 10, wherein the first thrust bearing raceway is distal to the second thrust bearing raceway and the third thrust bearing raceway relative to a puck end of the actuator assembly.

13. The actuator assembly of claim 9, wherein the first thrust bearing raceway comprises a distal-most thrust bearing raceway relative to a puck end of the actuator assembly and disposed in the actuator assembly.

\* \* \* \* \*